Nov. 24, 1936.   G. A. ORMAN   2,061,669
FLEXIBLE BLADE SCRAPER
Filed March 10, 1936

INVENTOR.
Gustav A. Orman
BY James Harrison Bower
ATTORNEY.

Patented Nov. 24, 1936

2,061,669

UNITED STATES PATENT OFFICE 2,061,669

FLEXIBLE BLADE SCRAPER

Gustav A. Orman, Brooklyn, N. Y.

Application March 10, 1936, Serial No. 68,022

6 Claims. (Cl. 145—47)

The purpose of this invention is to provide a scraper that is particularly adapted for scraping floors, or other surfaces or the like, which has a thin flexible blade that may be readily adjusted and sharpened by one using it.

The invention is a scraper having a flexible blade clamped in a casing in which the blade is held so that the working end is held in a curve and the scraping edge extends slightly outward and also in which the blade may be readily released, adjusted, and sharpened with a few strokes of a file.

Scrapers of this type are normally provided with relatively heavy blades similar to blades used in planes and these are sharpened with a beveled edge and when the edge wears it is necessary to take out the blade, remove a hook formed on the edge thereof, and grind, hone or sharpen it in a machine or with a stone and; as a scraper is much more efficient if a sharp cutting edge is maintained continuously these edges should be sharpened at relatively short intervals and, therefore, to provide a scraper in which the blade may be readily moved out and sharpened with a few strokes of a file makes it possible for a person scraping a floor to stop for a few seconds and adjust and sharpen the scraper without getting up.

The object of the invention is, therefore, to provide a scraper adapted to be used for scraping floors and the like, in which the scraping blade may be readily adjusted and sharpened without removing the blade from the scraper, and in a relatively short length of time.

Another object is to provide a hand scraper in which a thin flexible blade may be used.

Another object is to provide a scraper having a blade adapted to be formed in a curve in which the blade may be formed in a few minutes.

Another object is to provide a scraper having a flexible blade in which the length of the scraping edge may be adjusted in a few minutes.

A further object is to provide a scraper having a thin flexible blade in which the blade may be sharpened in a few minutes by a few strokes of a file.

And a still further object is to provide a holder for a thin flexible blade in which the blade may be held in a curved position and readily adjusted and sharpened, which is of a simple and economical construction.

With these ends in view the invention embodies a casing, preferably of a rectangular shape, with the lower side curved upward at the front, a thin flexible blade, a shoe having a curved lower side corresponding with that of the casing, a cover hinged to the casing and having a cam shaped projection adapted to force the shoe against the blade as the cover is closed, a traveling socket mounted on a screw for holding and adjusting the end of the blade and a suitable handle.

Other features and advantages of the invention will appear from the following description taken in connection with the drawing, wherein.

Figure 1:
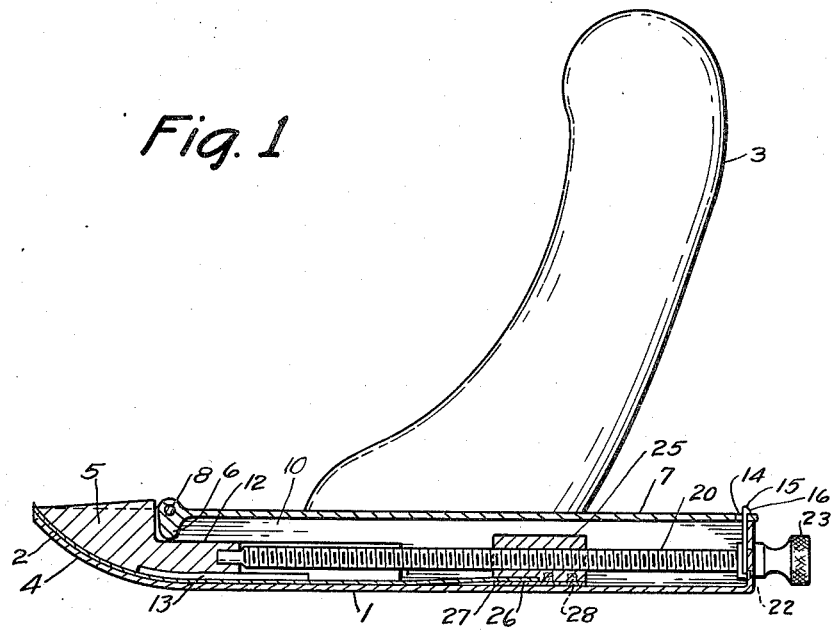
Figure 1 is a view showing a longitudinal section through the device.
Figure 2:
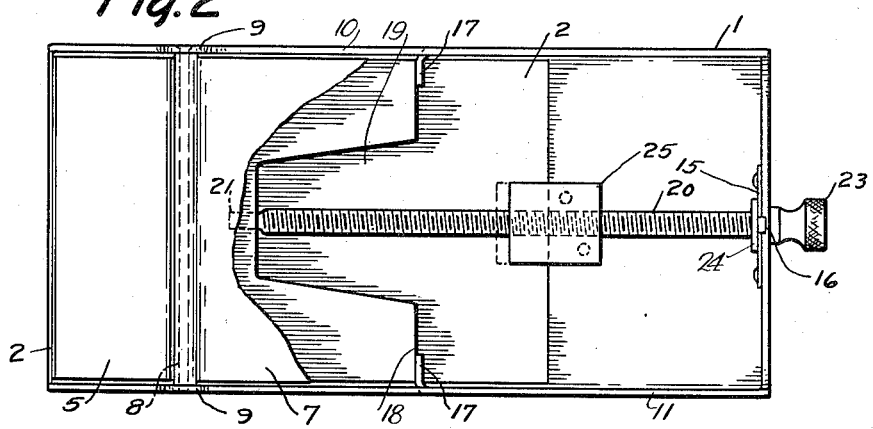
Figure 2 is a plan view with parts broken away showing the interior construction.
Figure 3:
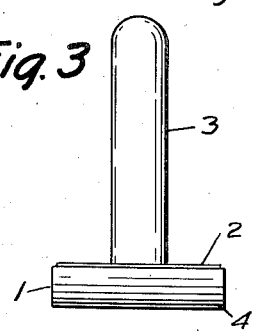
Figure 3 is a front elevation of the device.
Figure 4:
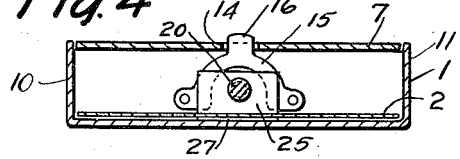
Figure 4 is a cross-section through the device.

In the drawing the scraper is shown as it may be made, wherein numeral 1 indicates the casing, numeral 2 the scraper blade, and numeral 3 the handle.

The casing is preferably made of a rectangular shape with the lower surface of the forward or cutting end curved upward as shown at the point 4, and the plate 2 is held against the inner surface thereof by a shoe 5 and the shoe 5 is clamped downward by a cam member 6 on the end of the cover 7. The cover 7 is pivotally mounted on a pin 8 in ears 9 which extend upward from the sides 10 and 11 of the case and the cam 6 extends downward engaging a surface 12 on the upper side of the shoe. It will be noted that as the cover 7 is opened the cam 6 will move upward away from the surface 12, thereby releasing the shoe and blade, and when the cover is moved downward the cam 6 will force the shoe against the blade, thereby forming it in the curved position shown. The under surface of the shoe is recessed, providing an open space 13 so that the shoe engages the blade only at each end. The upper surface of the shoe is substantially flush with the sides of the casing, and this extends to a point adjacent the cam, thereby substantially closing the upper part of the device. The handle 3 may be attached to the cover by any suitable means, and the cover 7 may be provided with an opening 14 that is adapted to receive a spring latch 15 on the case to lock the cover in place, and it will be noted that as the cover is closed the upper end of the latch will pass through the opening 14 and a projection 16 of the latch will snap over the cover and as the latch is pressed inward it will release the cover so that it may be raised. It will be understood that a latch of any other type may be used.

Projections 17 may be provided in the sides of the case to engage the inner end 18 of the shoe to hold the shoe in place, and it will be noted that the inner end of the shoe is also provided with a recess 19 into which a threaded rod 20 extends and the inner end of the rod is held in a bearing 21, whereas the outer end is held in a bearing 22 in the back of the case. The bearing 22 is formed in the end of the case and the screw is provided with a nut 23 on the outer end by which it may be turned, and a collar 24 is fixedly attached to the screw on the inside, thereby preventing the screw from moving lengthwise and permitting it to be turned by the nut. The screw is rigidly mounted in the nut, and it will be noted that as the screw is turned a traveling member 25 will move backward and forward and as the member 25 engages the end of the blade 2 it will move the blade forward. In the design shown the member 25 is provided with a recess 26 into which the back of the blade extends and this recess is formed by a thin plate 27 held on the lower side of the member 25 by screws 28 as shown. It will be understood, however, that this recess may be formed in any other manner.

It will be understood that other changes may be made in the construction without departing from the spirit of the invention. One of which changes may be in the use of a casing formed in any other manner, another may be in the use of other means for holding the flexible blade in the casing, another may be in the use of a clamp of any other design, and still another may be in the use of other means for adjusting the position of the blade.

The construction will be readily understood from the foregoing description. In use the device may be provided as shown and described, and it will be noted that the member 25 may be started at the back of the casing and worked forward by turning the screw and with the lower edge of the flexible blade held in this member the blade may be forced out of the opposite end of the casing when released by raising the cover, which permits the shoe 5 to move away from the blade. The lower side of the case tapers to a point at the cutting edge of the blade, and it will be noted that with a relatively thin flexible blade the cutting edge may be forced out and then this edge may be sharpened by running a file over it a few times, and this action may be repeated while using the scraper.

The nose or tip of the case adjacent the cutting edge of the scraper may be case hardened to prevent wear.

Having thus fully described the invention, what I claim as new and desire to secure by Letters Patent is:

1. A scraper of the type using a relatively thin flexible blade comprising a flat casing with the forward scraping end curved upward, said casing having sides and a back, a shoe with a curved under surface corresponding to the curved scraping end of the casing freely mounted in said casing, a cover plate pivotally mounted between the sides of said casing, and having a cam projection adapted to engage the upper surface of said shoe, forcing said shoe downward toward said casing, a handle mounted on said cover, a latch adapted to hold said cover in the closed position, a screw journalled in the inner end of said shoe and in the back of said casing, means turning said screw from the exterior of said casing, a traveling member mounted on said screw and adapted to be moved backward and forward as the screw is turned, and a flexible blade adapted to be placed between the shoe and casing and with the inner end engaged by the traveling member on said screw.

2. A scraper of the type using a relatively thin flexible scraping blade comprising a casing consisting of a relatively flat rectangular shaped box with the base curved upward at one end, a holding member with a curved under surface corresponding to the curved end of the base of the casing, means clamping said holding member against a blade held between the holding member and casing, and means adjusting the blade mounted therein from the exterior of the casing.

3. A scraper as described in claim 2 characterized in that the clamping means comprises a cover pivotally mounted in the casing with a cam projection on the under side thereof.

4. A scraper as described in claim 2, characterized in that the clamping means comprises a cover pivotally mounted in the casing with a cam projection on the under side thereof and situated directly under the point at which the cover is pivotally mounted in the casing, and having a handle mounted on said cover.

5. A scraper as described in claim 2, characterized by a handle extending from the upper side thereof, and in which the clamping means is operated by the handle.

6. A scraper as described in claim 2, characterized in that a traveling member is provided therein for engaging the inner end of a scraping blade and the means adjusting the position of the blade from the exterior of the casing operates through said traveling member.

GUSTAV A. ORMAN.